UNITED STATES PATENT OFFICE.

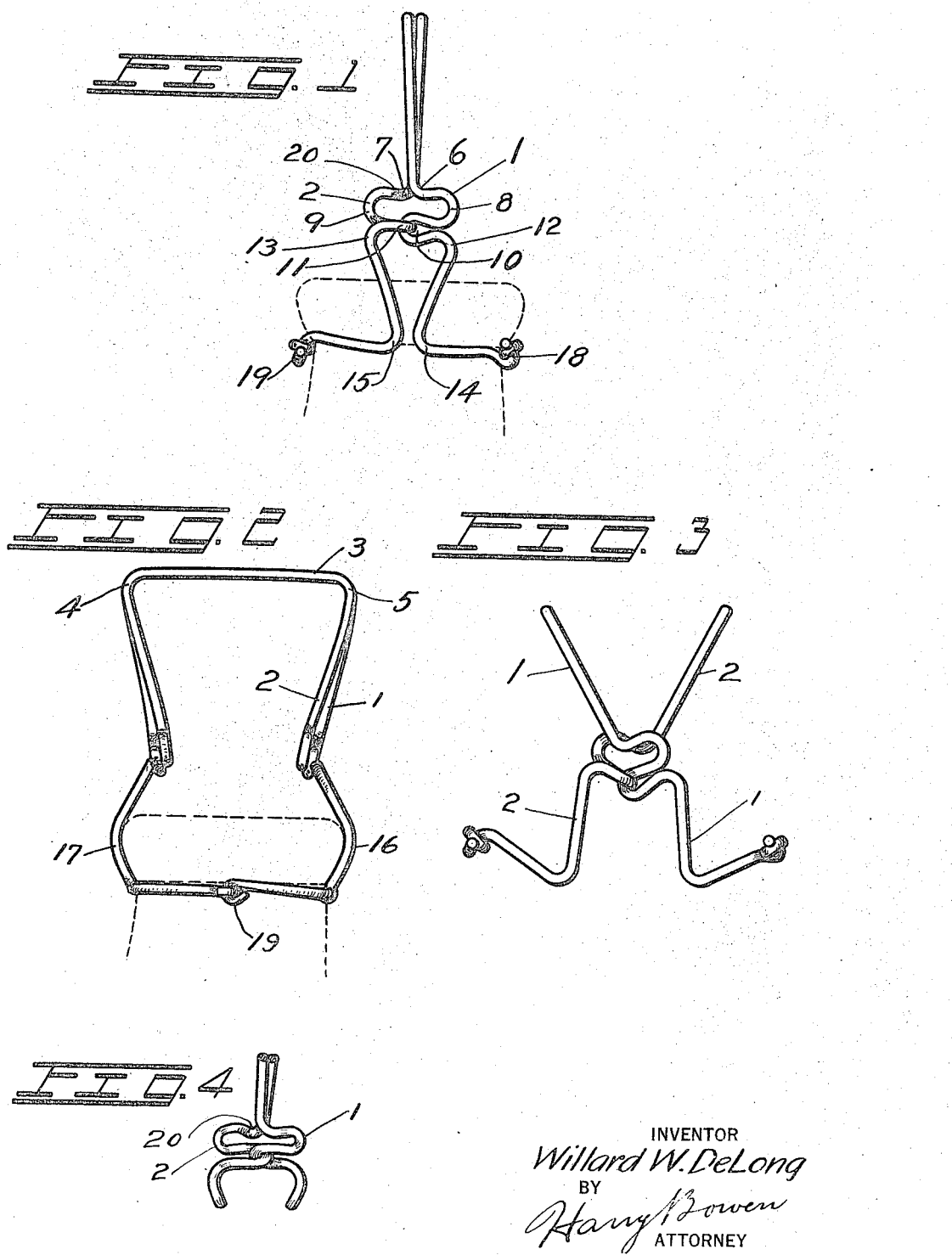

WILLARD W. DE LONG, OF SEATTLE, WASHINGTON.

MILK-BOTTLE CARRIER.

1,424,995.   Specification of Letters Patent.   Patented Aug. 8, 1922.

Application filed December 6, 1921. Serial No. 520,267.

*To all whom it may concern:*

Be it known that I, WILLARD W. DE LONG, a citizen of the United States, residing at Seattle, county of King, and State of Washington, have invented a new and useful Milk-Bottle Carrier; and I do hereby declare that the following is a full, clear, and exact specification, such as will enable others skilled in the art to which it appertains to make and use the same.

The invention is a device for carrying milk bottles which may readily be placed over the top and which grips it around the neck.

The object of the invention is to construct a device which may be made in two sections and when these are placed together will form a device for carrying milk bottles, the lower end of which will open up to fit over the top of the milk bottle and then when one takes hold of the handle the lower end will be drawn together so as to grip the top of the milk bottle.

With these ends in view, the invention embodies two sections of wire bent similar to each other, each with a straight bar across the top to form a handle with the ends bent downward forming S shaped loops about midway of their length, which, when pushed together will form hinges and with their lower ends bent around a semi-circle and clinched together at the center.

Other features and advantages of the invention will appear from the following description taken in connection with the drawings, wherein—

Figure 1 is an end elevation.
Figure 2 is a side elevation.
Figure 3 is an end elevation showing the device open.
Figure 4 is a section showing a lug which locks the device closed.

In the drawings I have shown my device as it would appear in carrying a milk bottle wherein numeral 1 indicates one of the sections and numeral 2 the other. Each of the sections are constructed with a straight bar free at the top as shown in Figure 2 which is bent downward at the points 4 and 5, then bent outward at the points 6 and 7 shown in Figure 1 to form the loops 8 and 9. Section 1 is then bent around to form another loop 10 in a vertical plane, whereas section 2 is bent around to form another loop 11 in a horizontal plane so that as these two loops are put together they form a hinge, the center of which is the axis of the device. From these loops the sections are bent outward to the points 12 and 13 and then bent downward to the points 14 and 15, while at the same time they are bent backward at the points 16 and 17 shown in Figure 2 to conform to the lower side of the top of the milk bottle; and then from the points 14 and 15 they are bent around to form semi-circles in the centers of which the two ends of the wires are clinched together as shown in Figures 1 and 2 at the points 18 and 19.

At the point 7 on the section 2 is a lug 20 shown more clearly in Figures 1 and 4. This lug is formed by bending the wire slightly outward and when the two sections are pulled together to the position shown in Figure 1, the portion of wire at the point 6 of section 1 will spring outward to pass over this notch and after it has passed over it will be locked behind it. This prevents any possibility of the device opening and dropping off of the milk bottle when the bottle is set down.

It will be understood that changes in the construction may be made without departing from the spirit of the invention. One of which changes may be in the use of the material of different shapes instead of the round wires as shown; another may be in the fastening of the wires together at any point along them instead of the point at the center of the semi-circle and still another may be in the method of hinging them together.

The construction is readily understood from the foregoing description. To use the device it may be placed over the top of a milk bottle in the position shown in Figure 3 and when the two bars 3 are drawn together by taking hold of them the lower ends will come together to grip the top of the bottle and they will be locked together by the portion of section 1 passing over the notch in section 2. Then when it is desired to remove the device the bars 3 may be pulled apart and it may be lifted off of the bottle.

Having thus fully described the invention what I claim is new and desire to secure by Letters Patent is:—

1. A bottle carrier of the type described comprising two sections of wire with straight bars at the top extending horizontally, vertical sections extending downward from the bars, S shaped sections about half way down the vertical sections, a notch on one of the sections at the upper end of the S shaped sections, semi-circles in the horizontal plane formed by bending the wires from the bottoms of the vertical sections in towards the center and then around the semi-circle, and loops on the ends of the wires at the center of the semi-circle for clinching the ends together.

2. A device of the type described comprising two sections of material each bent to form straight bars at the top, then bent downward, then bent to form S shaped sections about half-way down the vertical portions which when put together form hinges and then bent in the form of semi-circles in a horizontal plane at the lower ends of the vertical sections.

3. A bottle carrier of the type described comprising two sections of wire with straight bars at the top extending horizontally, vertical sections extending downward from the bars, S shaped sections about half-way down the vertical sections, semi-circles in the horizontal plane formed by bending the wires from the bottoms of the vertical sections in towards the center and then around the semi-circle, and loops on the ends of the wires at the center of the semi-circle for clinching the ends together.

4. A device of the type described comprising two sections of material each bent to form straight bars at the top, then bent downward, then bent to form S shaped sections about half-way down the vertical portions which when put together form hinges, the vertical portions then bent outward and then inward to conform to the bead on the top of the milk bottle, and then bent in the form of semi-circles in a horizontal plane at the lower ends of the vertical sections.

5. A device of the type described comprising two sections of material each bent to form straight bars at the top, then bent downward, then bent to form S shaped sections about half-way down the vertical portions which when put together form hinges, one of the sections having a notch at the top of the S shaped section to lock them together when closed, and then bent in the form of semi-circles in a horizontal plane at the lower ends of the vertical sections.

WILLARD W. DE LONG.